(12) United States Patent
Muthiah et al.

(10) Patent No.: US 12,242,378 B2
(45) Date of Patent: Mar. 4, 2025

(54) DATA STORAGE DEVICE MANAGEMENT SYSTEM

(71) Applicant: Sandisk Technologies, Inc., Milpitas, CA (US)

(72) Inventors: Ramanathan Muthiah, Bangalore (IN); Balaji Thraksha Venkataramanan, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 17/850,483

(22) Filed: Jun. 27, 2022

(65) Prior Publication Data
US 2023/0418741 A1    Dec. 28, 2023

(51) Int. Cl.
*G06F 12/02* (2006.01)
*G06F 3/06* (2006.01)
*G06F 11/14* (2006.01)

(52) U.S. Cl.
CPC ........ *G06F 12/0292* (2013.01); *G06F 3/0622* (2013.01); *G06F 3/0644* (2013.01); *G06F 3/0679* (2013.01); *G06F 11/1456* (2013.01); *G06F 12/0246* (2013.01); *G06F 2212/171* (2013.01); *G06F 2212/2146* (2013.01)

(58) Field of Classification Search
None
See application file for complete search history.

(56) References Cited

U.S. PATENT DOCUMENTS

| | | | |
|---|---|---|---|
| 10,102,144 B2 | 10/2018 | Sundararaman et al. | |
| 2004/0117572 A1* | 6/2004 | Welsh | G06F 11/1451 711/161 |
| 2004/0268074 A1* | 12/2004 | Yagi | G06F 21/78 711/115 |
| 2006/0069840 A1* | 3/2006 | Corbett | G06F 21/79 710/313 |
| 2011/0113427 A1* | 5/2011 | Dotan | G06F 21/53 718/1 |
| 2011/0161298 A1 | 6/2011 | Grobman et al. | |
| 2013/0174252 A1* | 7/2013 | Weber | H04W 12/50 726/20 |
| 2014/0317350 A1 | 10/2014 | Langas et al. | |
| 2015/0171928 A1* | 6/2015 | Lee | H04M 1/72412 455/41.1 |
| 2016/0028713 A1* | 1/2016 | Chui | G06F 21/35 726/4 |
| 2017/0344430 A1* | 11/2017 | Greer | G06F 11/1456 |
| 2017/0371572 A1* | 12/2017 | Lee | G06F 3/064 |

(Continued)

FOREIGN PATENT DOCUMENTS

KR    20160007926 A  *  1/2016  ............ H04W 4/80

OTHER PUBLICATIONS

Translation of KR-20160007926-A. 2023.*
San Disk. "SanDisk Connect™ Wireless Flash Drive." 2015. https://downloads.sandisk.com/downloads/um/wfd-ios-um.pdf.*

*Primary Examiner* — Nathan Sadler
(74) *Attorney, Agent, or Firm* — PATTERSON + SHERIDAN, LLP (57) ABSTRACT

Devices and techniques are disclosed wherein an end user can remotely trigger direct data management activities of a data storage device (DSD), such as creating a data snapshot, resetting a snapshot, and setting permissions at the DSD via a remote mobile device app interface.

20 Claims, 5 Drawing Sheets

(56) References Cited

U.S. PATENT DOCUMENTS

| | | |
|---|---|---|
| 2019/0087130 A1* | 3/2019 | Lee .................... G06F 11/1448 |
| 2020/0242021 A1 | 7/2020 | Gholamipour et al. |
| 2021/0286762 A1 | 9/2021 | Benisty et al. |
| 2022/0027472 A1 | 1/2022 | Golden et al. |

* cited by examiner

DATA STORAGE DEVICE MANAGEMENT SYSTEM

BACKGROUND

Snapshots can be used in storage systems to enhance data protection and efficiency. Snapshots were originally created to solve several data backup problems, including recovering corrupted data, backing up large amounts of data, and increasing application performance while a backup is in process. In some examples, a snapshot feature can use a copy-on-write technology. For example, after the snapshot is taken, the first write to any block or set of blocks on the base volume causes the original data to be copied to the reserved capacity before writing the new data to the base volume. Subsequent snapshots may include only changed data blocks.

Some examples of enterprise storage include a mechanism to restore changed data with a system restore point, which is commonly host driven and agnostic to the storage device used.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

DETAILED DESCRIPTION

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

The headings provided herein are for convenience only and do not necessarily affect the scope or meaning of the claims. Disclosed herein are example configurations and embodiments relating to data management of data storage devices by a remote control interface.

Overview

Snapshots can be used in data storage systems to recover corrupted data, back up large amounts of data, and increase application performance while a backup is in process. In some examples, a snapshot tool uses a copy-on-write technique, where initially a reference or pointer to the original data of the base volume may be used instead of making a complete copy of the original data. Then, after the snapshot is taken, the first write to any block or set of blocks on the base volume causes the original data to be copied to the reserved capacity of the storage system before writing the new data to the base volume. Subsequent snapshots may include only changed data blocks instead of making a complete copy of the entire volume.

Some examples of enterprise storage systems also create a fall back mechanism with minimal impact on production or storage efficiency. For instance, some operating systems also include a mechanism to restore changed data on a storage system with a system restore point. Commonly the system restore technique is host driven and is agnostic to the storage device used.

Generally, retail flash drive products belong to a different league and have different requirements. For example, many end users do not understand the technical aspects of storage system management and might rather prefer a simple management interface for retail flash devices, which can provide the user the ability to easily manage data and enable security features of the device. Such simple management can include the creation and reset of snapshots and some permissions control, for example.

Certain embodiments disclosed herein provide devices and techniques wherein an end user can remotely trigger direct data management activities of a data storage device (DSD), such as creating a data snapshot, resetting a snapshot, and setting permissions in the DSD via a user-friendly mobile device app interface. A DSD refers to a device that stores data, and can include hard disk drives (HDDs), solid state drives (SSDs), tape drives, hybrid drives, and so forth. Some embodiments of DSDs include removable (i.e., portable) data storage devices such as removable flash drives, memory cards, hard disk drives (HDDs), solid state drives (SSDs), hybrid drives, and so forth.

In various embodiments, the DSD creates a snapshot when it receives a remote snapshot request from the owner/user. The snapshot request can be triggered via a mobile application ("app") human interface (HID), for instance, where the mobile app is installed on a mobile computing device, such as a mobile telephone, a mobile tablet, or some other mobile device physically remote from the DSD. In some examples, the snapshot request (e.g., control instructions) may be transmitted and received using Bluetooth™ or another wireless technology. For example, the snapshot request (e.g., control instructions) may be transmitted from the mobile device and received at the DSD through an XUI (eXtra USB Interface). The actual internet protocol (IP) address of the hardware device may not be needed for the mobile device app to communicate with the DSD, which can improve security in the communication. Alternately, the snapshot request can originate at the host device.

The creation of the snapshot can be part of a disclosed technique to automate secured sharing of data on the DSD and to flexibly set up different read and write permissions for guest users in a post-snapshot timeline. For example, the owner/user can flexibly set up access permissions via the mobile app to avoid exposing the pre-snapshot data to any guest users. The app-based extra USB interface provides a remote interface to control the DSD (apart from a host interface). The app-based extra USB interface enables the owner/user to perform automatic data management tasks, to create and reset need-based snapshots, to create backups between snapshots, and so forth, which otherwise would be accomplished using manual intervention at the host when using a removable data storage product.

The devices and techniques disclosed herein additionally enable the end user to set up and manage protection against malicious software installations on the DSD. Optionally, the mobile app may be used to trigger secured erases on the DSD, based on security requirements. For instance, the user may desire to erase preselected data written between two user-created snapshots.

The solutions presented herein can provide for simplified data management compared to certain alternative systems. For example, the use of a mobile app to control, maintain, and customize data retention and security, including to manage data snapshots on a DSD, provides a simplified remote interface when compared to legacy techniques and systems (where these tasks are initiated at the host). Further, the end user's knowledge of data management processes need not be extensive to effectively use the capabilities of a sophisticated data management system with broad security components.

For example, a user that stores highly sensitive data on a removable DSD may desire to share the highly sensitive data with a designated recipient but conceal the highly sensitive data from all others. According to an embodiment of the present disclosure, the user can trigger the DSD to take a snapshot of the highly sensitive data via a mobile app on the user's mobile device and to also set the DSD to appear as though it is a new and unused DSD to other interested parties, while maintaining the highly sensitive data on the DSD and making it available to the designated recipient. Further, the user can allow a guest user to store data on the DSD without giving the guest user knowledge of the existence of the highly sensitive data. Alternately, one or more guest users may be given special permissions by the owner/user via the mobile app to read the highly sensitive data or to read and write to the highly sensitive data.

Data Storage Device Management System

Figure 1:
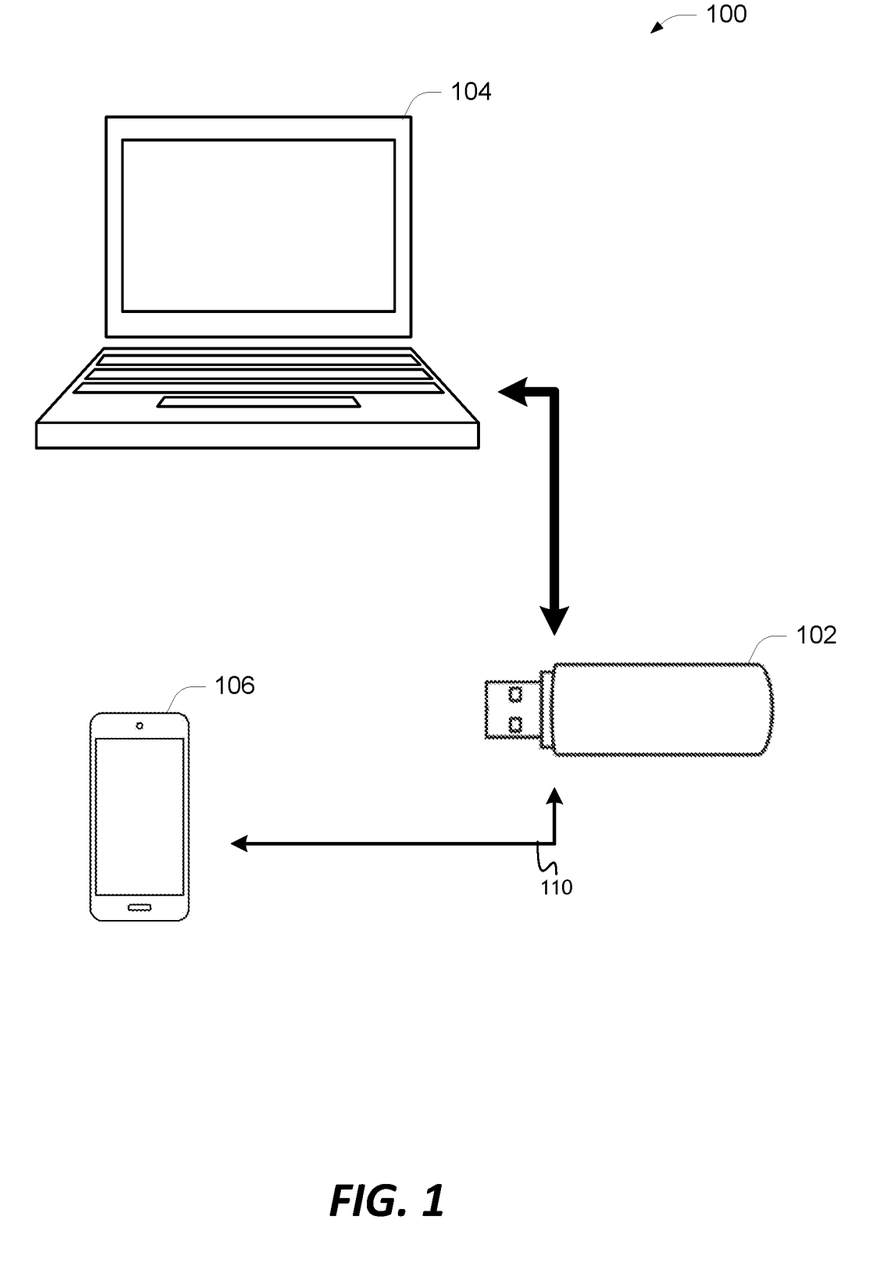
FIG. 1 is a block diagram of a data management system according to one or more embodiments.

FIG. 1 is a block diagram illustrating an example data storage device (DSD) management system 100 ("system 100") which includes an example data storage device (DSD) 102. As shown in the diagram of FIG. 1, the DSD 102 may comprise a portable or removable data storage device. The DSD 102 can be coupled to a host system ("host") 104 for data storage operations. For example, such data storage operations may include copying, transferring, synchronizing, or otherwise exchanging data between the host 104 and the DSD 102. Data storage operations may be achieved over any desirable or practical data communication path, such as a wired or wireless pairing between the DSD 102 and the host 104.

Figure 2:
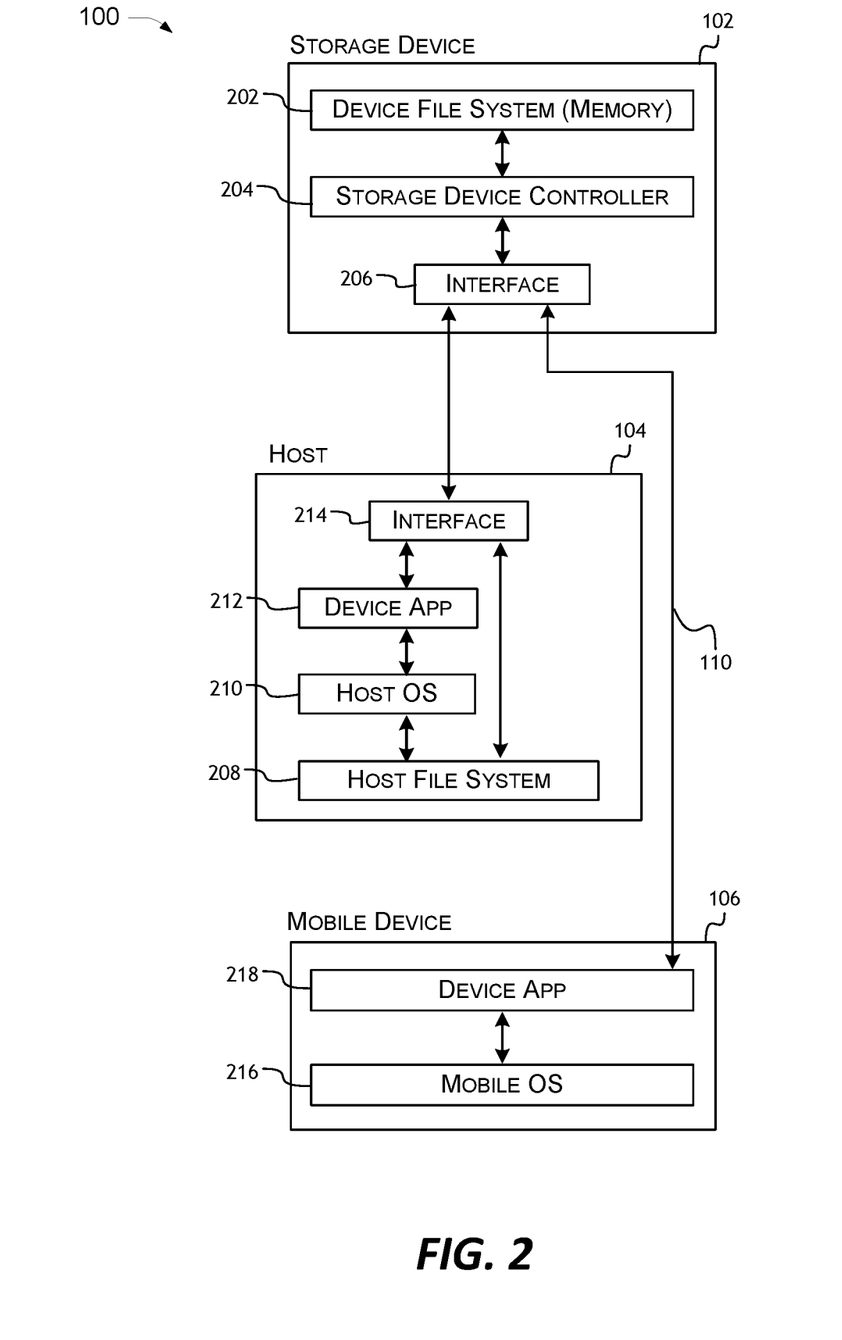
FIG. 2 is a block diagram of a data management system according to one or more embodiments.

Referring also to FIG. 2, the DSD 102 includes a device file system (device FS) or non-volatile memory 202, such as a solid state drive, NAND memory, hybrid drive, mechanical drive, or the like. In an example, the device FS 202 is comprised of non-volatile flash memory. The device FS 202 of the DSD 102 is managed and controlled by a storage device controller 204 and is accessed via an interface 206 of the DSD 102. The storage device controller 204 can comprise logic, firmware, and/or other processing components configured to execute instructions received at the DSD 102 (including via the interface 206) and/or stored in the device FS 202. The storage device controller 204 comprises sufficient controller functionality for implementing data storage operations, including data transfer between the DSD 102 and a host 104 directly without direction from a host controller. The interface 206 can include, among other components, wired and wireless communication and other input/output systems and components.

The host 104 includes a host file system (host FS) 208 which provides data storage at the host 104. An operating system (OS) 210 at the host 104 provides management and control of the host FS 208, including allowing access to the host FS 208 by installed applications, processes, or programs. A host device application (host device app) 212 installed at the host 104, which is managed by the OS 210, can provide external access to the host FS 208 via an interface 214. In some examples, the host device app 212 may be associated to the DSD 102. For instance, the host device app 212 may be configured to facilitate data storage operations between the device FS 202 of the DSD 102 and the host FS 208 of the host 104.

The DSD 102 can be operatively coupled to the host 104 using any of various physical and communication coupling techniques and protocols. For instance, the DSD 102 may be coupled to the host 104 using a Universal Serial Bus (USB) type coupling, such as USB type-A, type-B, type-C, type-A micro, type-B micro, a Lightning™ type or Thunderbolt™ type coupling, a Secure Digital (SD) type coupling, a Serial Advanced Technology Attachment (SATA) type coupling, an Integrated Drive Electronics (IDE) type coupling, and so forth. Various corresponding protocol types can be used to transfer data between the DSD 102 and the host 104, including a USB protocol, a Lightning™ or a Thunderbolt™ protocol, a SD protocol, a SATA protocol, an IDE protocol, a Peripheral Component Interconnect express (PCIe) protocol, a Non-volatile Memory express (NVMe) protocol, or the like.

As also shown at FIGS. 1 and 2, the system 100 includes a mobile device 106. The mobile device 106 comprises a mobile communications or computing device, such as a mobile telephone, a mobile tablet, or other mobile device physically remote from the DSD 102 and the host 104 and capable of executing instructions. For example, the mobile device 106 can include logic, a processor, a programmable controller, or other computational components for executing the instructions. The mobile device 106 is capable of communicating wirelessly with the DSD 102 and may also be capable of communicating wirelessly with the host 104.

The mobile device 106 can include a mobile operating system (OS) 216 arranged to manage applications, such as the mobile device application (mobile device app) 218, installed to the mobile device 106. In various embodiments, the mobile device app 218 is associated to the DSD 102, such that the mobile device app 218 is configured to remotely configure and manage the DSD 102, as well as to facilitate data storage operations between the device FS 202 of the DSD 102 and the host FS 208 of the host 104.

In an implementation, the mobile device app 218 can access the wireless capabilities of the mobile device 106. For example, the mobile device app 218 can establish a wireless communication link with the DSD 102 using Bluetooth™, WiFi, Near Field Communication (NFC), or other wireless technologies. In one example, the mobile device app 218 can establish an eXtra USB Interface (XUI) communication link 110 with the DSD 102 via one of the wireless technologies, such as Bluetooth™. The mobile device app 218 can remotely configure and control various data management and security settings of the DSD 102 via the wireless communication link 110.

In some cases, the techniques and devices disclosed herein may include additional block overprovisioning than a similarly positioned removable storage device. The additional overprovisioning may be desirable for the increased functionality over state-of-the-art storage solutions. For example an additional portion of the memory of the DSD 102 may be allocated for the device controller 204 functionality and instructions. However, if the memory capacity reduction in a snapshot period is acceptable post-snapshot, over-provisioning requirements may be much less, and may only comprise the L2P tables used. An acceptable memory capacity reduction can be predetermined or can be adjusted for a particular application.

Example Workflows and Use Cases

In various examples, responsive to receiving a snapshot request (e.g., control instructions) from the owner/user via the mobile device app 218 or a similar request, the DSD 102 is triggered to take a snapshot of the data within the device FS 202 through imaging the device FS 202 (for example FAT32) and the valid L2P pages, thereby imaging the data validity map within the device capacity. On a snapshot reset, the imaged device FS 202 and the set of L2P tables is deployed, thereby removing newer data added post-snapshot from the DSD 102. Likewise, the DSD 102 may use multiple snapshots at different points in time for one or more of the following example workflows and use cases.

Figure 3:
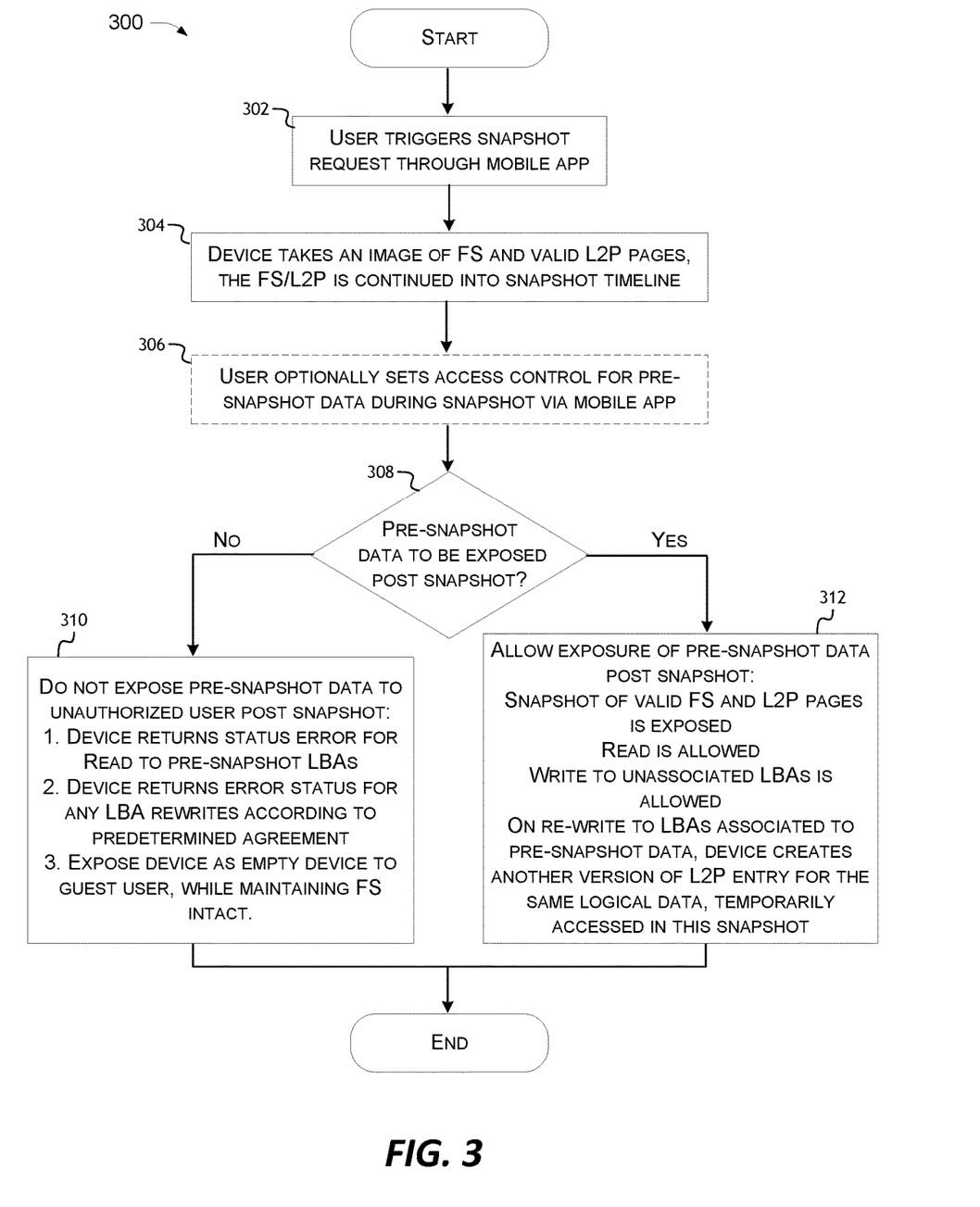
FIG. 3 is a flow diagram of an example data management workflow according to one or more embodiments.
Figure 4:
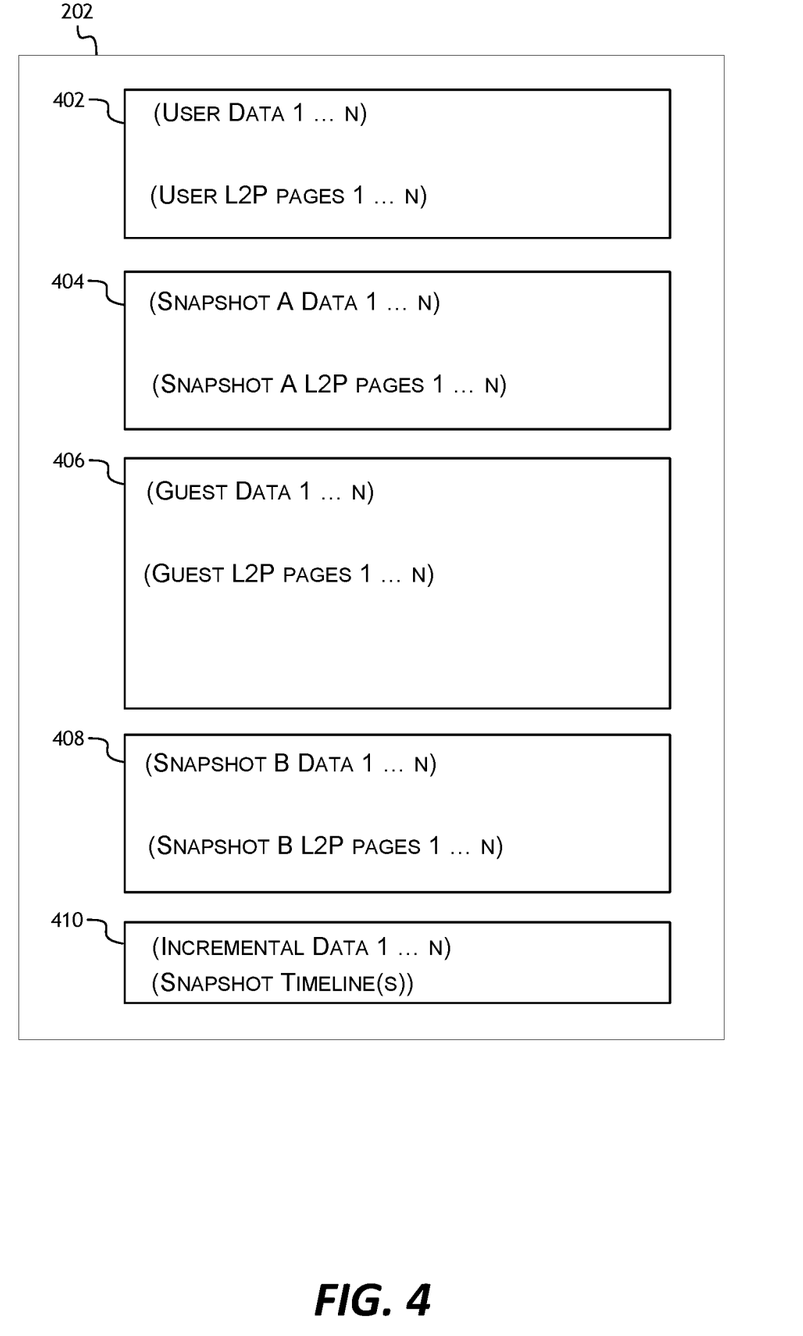
FIG. 4 is a block diagram of a data storage system according to one or more embodiments.

Referring to FIG. 3, a flowchart shows an example workflow 300, and referring to FIG. 4, a block diagram shows an example device file system (FS) 202 of an example DSD 102. FIGS. 3 and 4 further illustrate techniques and devices of the system 100 disclosed herein. At block 302 of FIG. 3, the owner/user can remotely trigger a snapshot of the device FS 202 of the DSD 102 with a user interface (UI) of the mobile device app 218 installed on the user's mobile device 106. The use of the mobile device app 218 enables the user to initiate data management operations such as triggering the snapshot remotely, rather than using an interface at the host 104. For instance, the mobile device app 218 can trigger control instructions to be transmitted to the DSD 102, based on user input at the mobile device app 218. However, alternately, the user may initiate the snapshot trigger at the host 104 if desired.

At block 304, the DSD 102 takes an image of the user data stored at a first portion 402 of the device FS 202 (which can comprise all of the user data stored to the DSD 102 to this point) and also copies valid logical-to-physical (L2P) pages associated to the imaged user data. In an example, the image of the first portion 402 is a snapshot of all of the user data stored at the DSD 102. The associated L2P pages are a correlation of logical addresses assigned to the blocks of user data to the physical addresses of memory locations of the device FS 202 in its current state. Unwritten Logical Block Addresses (LBA) may not be copied for efficiency. The image of the user data and the L2P pages is saved to a second portion 404 of the device FS 202 and saved to a snapshot timeline for the DSD 102. The snapshot timeline can be stored at any convenient memory location within the device FS 202 (such as memory portion 410, for example) and keeps a record of the dates and times that snapshots are taken. The owner/user can recall snapshot data that has been saved to the snapshot timeline.

In various embodiments, the snapshot technique may comprise a copy-on-write technique. For instance, the initial snapshot image may comprise a pointer or a reference to the originally stored user data (at memory portion 402) rather than a complete copy of the user data. In the embodiments, a full copy of the user data may be made (to memory portion 404, for example) when a write operation is triggered to the original user data (at memory portion 402). The pre-write user data is copied to the memory portion 404 and incremental changes to the pre-write user data can be stored at the same or another (e.g., memory portion 410) memory location. The combination of the pre-write user data and the incremental data changes comprises ongoing or future snapshots, which can be saved to the snapshot timeline. Accordingly, the owner/user can select a point on the snapshot timeline to access the user data as of that point in time.

In alternate embodiments, the snapshot technique can comprise copying the entire user data at various points in time (as triggered manually or automatically) or any portion of the entire user data at various points in time, to create multiple snapshots at those time points. The snapshot data (comprising one or more snapshots) is stored at one or more non-volatile memory portions (e.g., portion 404 or portion 408, for example) of the device FS 202. In an embodiment, the DSD 102 may create one or more versions of some portion of the imaged data during a snapshot process by creating multiple versions of the same logical data, rather than overwriting. Doing so can prevent accidental updates from some hosts in a multi-host environment.

At block 306, the user may optionally set or adjust access controls for the stored pre-snapshot (and initial snapshot) user data (stored at memory portions 402 or 404, for example) via the mobile device app 218. Restrictive access controls may be pre-set for the DSD 102 if the owner/user desires to store highly sensitive data to the DSD 102, for example. Access controls can include determining whether the pre-snapshot user data is accessible to any guest users of the DSD 102. Permissions may be granted or denied to guest users as desired by the owner/user via the mobile device app 218. In some cases, the owner/user may provide permission for one or more guest users to access the pre-snapshot data and deny permissions to any other guest users. Further, the owner/user can use the mobile device app 218 to define different access controls (e.g., for read and/or write) for different data across one or more snapshots. For instance, a guest user may receive access permission to read and/or write to the data from one snapshot but not another. Alternately, after a first snapshot, the guest user may have permission to read the existing data of the first snapshot but not write to that data, while the guest user may have permission to rewrite data of another version (a saved second version of the first snapshot) of the first snapshot logical data.

A guest user with permission may have a copy of the mobile device app 218 installed on the user's mobile device to access the restricted pre-snapshot data. Alternately, the owner/user can provide permission to a guest user via the mobile device app 218 of the owner/user. For example, the mobile device app 218 may cause the user's mobile device 106 send the guest user a code, a bar code, a Quick Response (QR) code, a graphic, or other authentication token or password. If permissions have been denied to all users except the owner/user, access to the pre-snapshot data can require the mobile device app 218 of the owner/user.

At block 308, the workflow 300 includes determining whether the pre-snapshot data is to be exposed to any guest users. The permissions set or adjusted at block 306 can determine whether the pre-snapshot data is to be exposed to any guest users, for instance. Block 310 illustrates an example workflow for the case where the pre-snapshot data is not to be exposed. For example, in one case the DSD 102 can return a status error when an attempt is made to read the pre-snapshot LBAs. While data may be stored at the LBA locations requested, the status error may provide an appearance that these data blocks are empty. Alternately, the host operating system 210 may fail the DSD 102 when the status error is received, which also preserves the security of the pre-snapshot data.

Additionally, the DSD 102 can return a status error when a request is made to rewrite to any pre-snapshot LBAs, according to a predetermined agreement. For example, the owner/user can set rules via the mobile device app 218 regarding when to deny or allow rewrites to pre-snapshot LBAs. In some cases, all rewrites to pre-snapshot LBAs may be denied. Writes may be allowed to other LBAs within the device FS 202 and may be allowed to pre-snapshot LBAs under certain circumstances, as determined by the owner/user.

Further, the DSD 102 can be exposed as an empty device (or unused device) to a guest user, while maintaining the device FS 202 intact. In other words, even though pre-snapshot data is stored at LBAs of the device FS 202 (at a memory portion 402, for instance), the DSD 102 presents as an empty or unused storage device to a guest user. Capacity design and block management techniques can be used by the DSD 102 to present the desired empty appearance to the guest user. For example, the logic of the storage device controller 204 can return the "empty" appearance when a command is received to read pre-snapshot data LBAs from an unauthorized source. Similarly, the storage device controller 204 can return the "empty" appearance when an unauthorized user attempts to determine the available storage capacity of the DSD 102.

Block 312 illustrates an example workflow for the case where the pre-snapshot data is allowed to be exposed. For example, a guest user can have access to the pre-snapshot data, at least for read access. No additional requirement may be needed for the guest user to read the pre-snapshot data. Also, a guest user can write to LBAs not associated to pre-snapshot data, if given permission via the mobile device app 218. For write operations to LBAs associated to pre-snapshot data (with permission), the DSD 102 can create another version of the L2P entries for the logical pre-snapshot data that is temporarily accessed in this snapshot. Capacity design and block management techniques can be used by the DSD 102 to provide the disclosed data management and to preserve snapshot point data. When a guest user is allowed write access to pre-snapshot LBAs, the snapshots in the snapshot timeline may provide a mechanism to go back in time (data-wise) to a snapshot point, but may not secure the owner/user's pre-snapshot data from a guest user.

Figure 5:
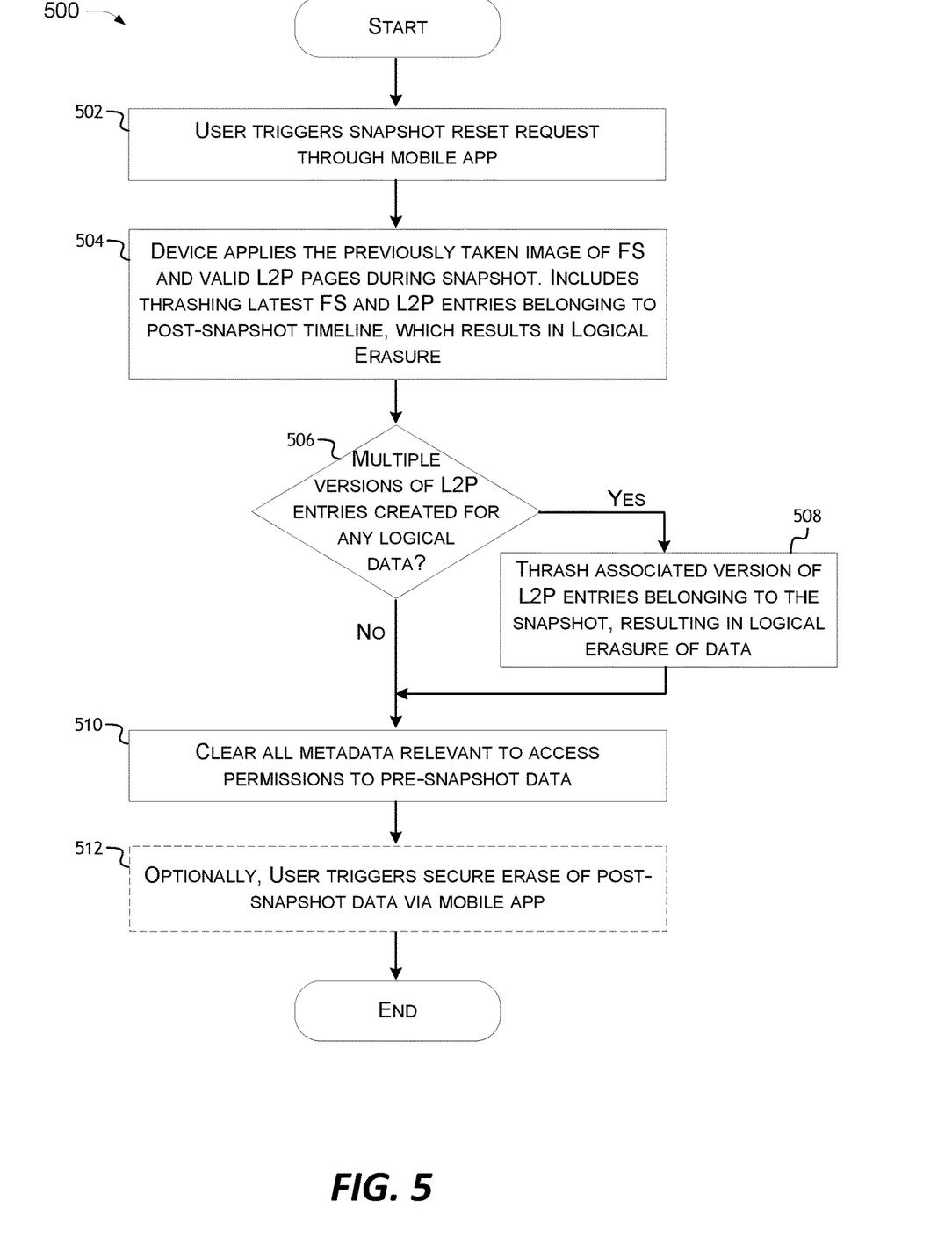
FIG. 5 is a flow diagram of an example data management workflow according to one or more embodiments.

Referring to FIG. 5, an example snapshot reset workflow 500 is illustrated. FIGS. 4 and 5 further illustrate techniques and devices of the system 100 disclosed herein. For instance, a snapshot reset workflow 500 includes resetting all or a portion of the non-volatile memory of the DSD 102, including clearing, erasing, and making un-accessible all or a portion of the data stored at LBAs within the device FS 202. In various embodiments, the owner/user may reset a portion of the memory of the DSD 102 (e.g., device FS 202) while retaining one or more other portions of the memory, including the pre-snapshot data, for example. Thus, the DSD 102 can be reset to a prior point on the snapshot timeline.

As part of the workflow 500, it may be assumed that a guest user has stored some guest data to the device FS 202 (such as at memory portion 406, for example) since the initial snapshot (e.g., stored at memory portion 404) by the owner/user. Further, the guest user or the owner/user may have initiated one or more additional snapshots subsequent to the guest user storing guest data to the device FS 202. The subsequent snapshots may be stored to another non-volatile memory portion of the device FS 202 (such as at memory portion 408, for example). Also as part of the workflow 500, the guest user may have returned the DSD 102 to the owner/user and the guest data may no longer be desired on the DSD 102. Accordingly, the owner/user may desire to reset the DSD 102 and return the DSD 102 to a state prior to use by the guest user.

At block 502 of FIG. 5, the owner/user can remotely trigger a snapshot reset of the device FS 202 with the user interface (UI) of the mobile device app 218 installed on the user's mobile device 106. The use of the mobile device app 218 enables the user to initiate data management operations such as triggering the snapshot reset remotely, rather than using an interface at the host 104. However, alternately, the user may initiate the snapshot reset trigger at the host 104 if desired. The user can initiate a snapshot reset to any snapshot image that is saved at the snapshot timeline, including the initial snapshot (stored at memory portion 402, for example), so long as it is still valid.

At block 504, the DSD 102 applies the user-selected snapshot image of the device FS 202, including the user data and the valid L2P pages associated to the selected snapshot. In an example, the user may select to reset the DSD 102 to the initial snapshot, prior to any changes to the pre-snapshot data or any guest user data. In the example, the storage device controller 204 applies the user data and the associated valid L2P pages corresponding to the pre-snapshot state of the device FS 202 (e.g., as stored at memory portion 402, for example).

The DSD 102 also thrashes the subsequently stored data of the device FS 202 (after the selected snapshot) and the associated L2P entries belonging to the post-snapshot timeline. This thrashing results in a logical erasure of the post-snapshot data and L2P entries.

At block 506, the DSD 102 (e.g., the storage device controller 204) checks to see if multiple versions of L2P entries were created for any logical data. This may be the case if write operations were performed to LBAs associated to pre-snapshot data or subsequent snapshot data, for example. If so, at block 508, the DSD 102 thrashes the associated version(s) of L2P entries belonging to the selected reset snapshot. This thrashing also results in the logical erasure of data.

At block 510, as part of the reset workflow 500, the DSD 102 (e.g., the storage device controller 204) clears all metadata relevant to access permissions to pre-snapshot data. This resets the permissions and enables the owner/user to set or reset any permissions for future access to the pre-snapshot data. At block 512, the owner/user may optionally use the mobile device app 218 (or alternately the host 104) to trigger a secure (physical) erase of any or all post-snapshot data, making the post-snapshot data irretrievable. In another example, the owner/user may optionally use the mobile device app 218 (or alternately the host 104) to trigger a secure erase of selected data (such as guest data at memory portion 406) including data written between two snapshots (such as the snapshots stored at memory portions 404 and 408).

In an example use case, the owner/user lends the DSD 102 to a guest user after initiating or applying a snapshot on the DSD 102. The owner/user or guest user can reset the DSD 102 to that saved snapshot, via the mobile device app 218 or similar, when it is returned to the owner/user. The existing data (pre-snapshot) may or may not be exposed to the guest user post-snapshot according to user/system settings. Note that this feature of not exposing the pre-snapshot data after the snapshot (data segregation) is entirely different from the enterprise use case of a fallback mechanism, which comprises a system restore. The system restore mechanism has no provision for applying restrictions or permissions on pre-snapshot data.

In another example use case, the DSD 102 can be used for experimentation or temporary app installation. Prior to such app installation, a snapshot is taken and stored on the DSD 102. After the experiment, the DSD 102 can be reset to that snapshot, with the reset being controlled via the mobile device app 218. This reset provides for automatically eliminating the installation, metadata, and the related data, of the experimental installation. A secured erase of the associated data between the two images (the snapshot and the installation state) is another system option.

In another example use case, the DSD 102 (user triggered or triggered by the storage device controller 204) initiates a snapshot when installing an executable from an unknown source (speculating malicious/malware installation). The DSD 102 automatically resets to that snapshot at any point on determining that the executable is malicious. In an example, all of the data on the DSD 102 is lost with the reset due to the malicious installation. Note that the reset to the snapshot can be after any amount of time (perhaps it was determined to be malicious after a month, for example). Hence, in some examples, a Namespace or logical group based snapshot can be used where the data associated to only certain logical groups is considered for the snapshot. In that way, data associated to other applications is not lost, and only that data related to the malicious installation (or other preselected data if specified by the owner/user or predetermined security provisions) may be reset. This can be done through controlled FS/L2P management, wherein only a portion of the control mapping is imaged. In response to malware or a virus being detected by the controller 204, an additional secure erase of preselected data between two snapshots may be triggered by the controller 204. Accordingly, the DSD 102 may install malicious speculative applications in a particular Namespace/NVMe Set/Endurance group after creating a snapshot in that Namespace and using the proposed method on a need basis.

In another example use case, the owner/user stores 2 movies and 10 personal documents in the device FS 202 (for instance at memory portion 402) of the DSD 102. Since the owner/user intends to lend the DSD 102 to a guest user, the owner/user creates a snapshot A (stored at memory portion 404, for example) and gives access permission to one or many logical regions (for instance memory portion 406) to the guest user, without giving permission to the pre-snapshot data (e.g., the 2 movies and 10 personal documents at memory portions 402 and 404). In the example, the 10 documents are shadowed such that the guest user is not aware of their presence on the DSD 102. Also, the 2 movies may be shadowed if the owner/user sets access restrictions for the entire snapshot A (via the mobile device app 218).

To continue the example use case, the guest user stores 3 movies to the DSD 102 (e.g., at memory portion 406). After transferring the 3 movies to another device, the guest user returns the DSD 102 with or without the 3 movies. Then the owner/user (or in some cases the guest user) simply resets the DSD 102 to the snapshot A using the mobile device app 218 (or alternately the host 104), so that the owner/user sees the 2 movies and the 10 personal documents as was the case during snapshot creation. The rest of the DSD 102, including the guest data is automatically reset and may be logically erased if desired. No manual moving of data is needed to reset the DSD 102 to the state it was in prior to lending the DSD 102 to the guest user.

In another example use case, the owner/user takes a snapshot of the DSD 102 prior to an excursion/party (such as travel for work) without much notice. Existing data stored to the DSD 102 could be personal, and the owner/user may not want the personal data to be exposed. Post excursion, the owner/user can make a backup of any important excursion data, for example to a cloud service. Alternately, if the owner/user sets up the configuration via the mobile device app 218, the DSD 102 may allow for "backup" data storage between snapshots. In some cases the excursion data may be associated to many guests, and permissions may be extended to any or all of those guests if desired. Once the backup excursion data is transferred or no longer desired to be stored on the DSD 102, the owner/user can initiate a snapshot reset via the mobile device app 218. After such a reset, only the "prior to excursion" data exists on the DSD 102. Any unwanted data, such as the excursion related data is thrashed automatically during the snapshot reset, without manual intervention by the owner/user to choose what is to be saved and what is to be deleted, thereby saving time.

ADDITIONAL EMBODIMENTS

Those skilled in the art will appreciate that in some embodiments, other types of data transfer methods and systems can be implemented while remaining within the scope of the present disclosure. In addition, the actual steps taken in the processes discussed herein may differ from those described or shown in the figures. Depending on the embodiment, certain of the steps described above may be removed, and/or others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, application-specific integrated circuit (ASIC), field-programmable gate array (FPGA), or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

What is claimed is:

1. A method of remotely managing a data storage device, comprising:
receiving control instructions at a portable data storage device via a wireless communication from a mobile device application configured to be installed on a remote mobile device capable of wireless communication;

remotely triggering, in response to the control instructions, a snapshot of data stored at a non-volatile memory of the portable data storage device;

imaging the data and valid logical-to-physical (L2P) pages associated with the data at the portable data storage device to form the snapshot; and setting access permissions during the snapshot, in response to the control instructions, including allowing a primary user access to a first portion of the non-volatile memory and to the snapshot and allowing a guest user access to the first portion of the non-volatile memory but not to the snapshot.

2. The method of remotely managing a data storage device of claim 1, further comprising:

denying permission for access by the guest user to the imaged data via the mobile device application; and returning a status error at the portable data storage device in response to an attempt by the guest user to read from or write to a logical block address containing the imaged data.

3. The method of remotely managing a data storage device of claim 2, further comprising presenting the non-volatile memory of the portable data storage device to the guest user as empty of data while maintaining the imaged data and valid L2P pages within the non-volatile memory of the portable data storage device.

4. The method of remotely managing a data storage device of claim 2, further comprising:

allowing the guest user to write guest data to a logical block address of the non-volatile memory not containing the imaged data; and remotely resetting the portable data storage device with the mobile device application to the snapshot, wherein the resetting includes automatically restoring the data and valid L2P pages of the snapshot to the non-volatile memory and logically erasing any subsequently stored guest data and L2P entries associated with the subsequently stored guest data.

5. The method of remotely managing a data storage device of claim 1, further comprising automatically resetting the portable data storage device to the snapshot in response to the portable data storage device determining that an installed executable file is malicious, wherein the resetting includes automatically restoring the data and valid L2P pages of the snapshot to the non-volatile memory and logically erasing any preselected subsequently stored data and L2P entries associated with the preselected subsequently stored data.

6. The method of remotely managing a data storage device of claim 5, further comprising triggering, via the mobile device application, a physical erase of the preselected subsequently stored data and L2P entries associated with the preselected subsequently stored data.

7. A remotely managed portable data storage device, comprising:

a means for operatively coupling with a host;

a non-volatile memory for storing user data; and a controller configured to concurrently manage data operations and security settings at the non-volatile memory without manual intervention of the host in response to receiving control instructions via a wireless communication, including creating a snapshot of at least a portion of the non-volatile memory in response to receiving a remote snapshot request via the wireless communication, and concurrently setting access permissions including allowing a primary user access to a first portion of the non-volatile memory and to the snapshot and allowing a guest user access to the first portion of the non-volatile memory but not to the snapshot in response to receiving a single remote permissions request via the wireless communication.

8. The remotely managed portable data storage device of claim 7, wherein the data operations further include:

reset the portable data storage device to the snapshot; and set access permissions for other guest users relative to the snapshot.

9. The remotely managed portable data storage device of claim 8, wherein the set access permissions include prevent exposure of the user data to the other guest users.

10. The remotely managed portable data storage device of claim 7, wherein a mobile device application is configured to be installed at a mobile communication device remote from the portable data storage device, the mobile device application further configured to initiate a wireless transmission of the control instructions via the mobile communication device.

11. The remotely managed portable data storage device of claim 7, wherein:

the portable data storage device comprises a removable flash drive; and the non-volatile memory comprises NAND flash memory.

12. A system for remote data management, comprising:

a portable data storage device including:

an interface for operatively coupling with a host device;

a non-volatile memory for storing user data; and a controller configured to create a snapshot of at least a portion of the non-volatile memory without manual intervention of the host device in response to receiving a remote snapshot request via a wireless communication, the controller further configured to, during the snapshot and in response to receiving a single remote permissions request via the wireless communication and without intervention of the host device:

provide a primary user access to a first portion of the non-volatile memory and to the snapshot; and provide a guest user access to the first portion of the non-volatile memory but not to the snapshot; and a mobile device application configured to trigger transmission of the remote snapshot request and the remote permissions request via the wireless communication.

13. The system of claim 12, wherein the interface is configured for an exchange of data between the portable data storage device and the host device.

14. The system of claim 12, wherein the non-volatile memory includes a device file system with memory portions arranged to store data at logical block addresses (LBAs).

15. The system of claim 12, wherein the mobile device application is further configured to be installed at a remote mobile device configured for wireless communication.

16. The system of claim 12, wherein the snapshot comprises an image of data stored at the non-volatile memory and valid logical-to-physical (L2P) pages associated with the data.

17. The system of claim 16, wherein the controller is further configured to create a Namespace or logical group based snapshot in response to receiving the remote snapshot request, wherein the image includes data associated with one or more predetermined logical block addresses (LBAs) of the non-volatile memory.

18. The system of claim 16, wherein the controller is further configured to conceal the data associated with the snapshot from the guest user.

19. The system of claim 16, wherein the controller is further configured to reset the portable data storage device to the snapshot in response to receiving a remote reset request via the wireless communication, the reset comprising automatically restoring the data and valid logical-to-physical (L2P) pages of the snapshot to the non-volatile memory and logically erasing any subsequently stored data and L2P entries associated with the subsequently stored data.

20. The system of claim 16, wherein the controller is further configured to set access permissions to the snapshot in response to receiving the remote snapshot request, the access permissions including to grant or deny permission to access all or portions of the imaged data stored at the non-volatile memory.

* * * * *